United States Patent [19]

Orr et al.

[11] Patent Number: 4,642,216
[45] Date of Patent: Feb. 10, 1987

[54] CONTROL ROD CLUSTER ARRANGEMENT

[75] Inventors: William L. Orr, Ligonier; Pratap K. Doshi, Murrysville; Claude M. Mildrum, Monroeville; Thomas R. Freeman, Greensburg, all of Pa.

[73] Assignee: Westinghouse Electric Corp., Pittsburgh, Pa.

[21] Appl. No.: 588,596

[22] Filed: Mar. 12, 1984

[51] Int. Cl.⁴ .............................................. G21C 7/24
[52] U.S. Cl. .................... 376/327; 376/224; 376/333; 376/339
[58] Field of Search ............... 376/327, 333, 224, 225, 376/449, 228, 339

[56] References Cited

U.S. PATENT DOCUMENTS

| | | |
|---|---|---|
| 3,008,884 | 11/1961 | Schippereit et al. |
| 3,103,479 | 9/1963 | Ransohoff ............................ 376/327 |
| 3,340,047 | 9/1967 | Perrson et al. |
| 3,344,019 | 8/1967 | Bogaardt . |
| 3,365,368 | 1/1968 | Fray ...................................... 376/333 |
| 3,448,008 | 6/1969 | Hellman . |
| 3,625,816 | 12/1971 | Aleite et al. ......................... 376/333 |
| 3,713,971 | 1/1973 | Van Santen et al. ................ 376/327 |
| 3,734,825 | 5/1973 | Schabert et al. .................... 376/353 |
| 3,816,245 | 6/1974 | Bevilacqua ......................... 376/225 |
| 3,985,514 | 10/1976 | Miller . |
| 4,172,762 | 10/1979 | Anthony et al. . |

OTHER PUBLICATIONS

Nuclear Technology, vol. 60, 3183, pp. 344–351, Radford et al.

*Primary Examiner*—Harvey E. Behrend

[57] ABSTRACT

A control rod assembly arrangement is disclosed for a light water nuclear reactor. Absorber rods are combined with stainless steel rods to achieve a more homogeneous poison distribution effect which reduces power depression within associated fuel assemblies and thereby flattens the overall power distribution within the core. In addition to improved load follow performance, safety analysis margins are improved due to the reduction in control rod reactivity worth.

2 Claims, 3 Drawing Figures

CONTROL ROD CLUSTER ARRANGEMENT

BACKGROUND OF THE INVENTION

1. Field of the Invention

This invention relates in general to the field of light water nuclear reactors and more particularly to control rods for light water nuclear reactors.

2. Description of the Prior Art

In the pressure vessel of a commercial pressurized light water reactor, a reactive region commonly referred to as a nuclear core contains fissile fuel such as uranium-235 or plutonium-239 in which sustained fission reactions occur and generate heat. A reactor coolant, comprising, for example, light water, is used to remove the heat generated by the nuclear reaction. The reactor coolant flows into the pressure vessel, through the nuclear core, out of the pressure vessel, through steam generators and then back into the pressure vessel. Another cooling medium which most often is also water, is arranged in heat transfer relationship with the reactor coolant within the steam generator. The secondary cooling medium is converted into steam in the steam generator and is thereafter used to produce electricity by conventional large steam turbine-electrical generator combinations.

In the above-described type of nuclear reactor, control rods are used to control the power output and the power distribution within the nuclear core, and to shut down the nuclear reaction. Control rods typically comprise a plurality of elongated rods which are attached to a shaft and are insertable into the core from outside the pressure vessel. A rod drive mechanism positioned atop of the pressure vessel is used with each control rod assembly to move the control rod into and out of the core.

Control rods comprise or contain materials which absorb neutrons produced by the fission process. Accordingly, in the prior art, materials having a high neutron capture cross section such as boron carbide ($B_4C$), hafnium or silver-indium-cadmium have been used. The use of such materials has not been without disadvantage. Boron carbide requires special manufacturing techniques, processes and precautions to assure component integrity. Then too, boron carbide depletes more rapidly than other absorber materials, thereby shortening the useful life of the control rods. Large quantities of helium gas are also released with depletion which result in high internal pressures within the control rod cladding. These shortcomings of $B_4C$ have led to a preference of the use of hafnium and/or silver-indium-cadmium for control rod materials. Both of these materials, however, are expensive. Also, cadmium and indium are scarce and are on the U.S. Government's list of strategically scarce metals, and, since hafnium and silver-indium-cadmium have high neutron capture cross sections, the introduction of such high neutron absorbers into the core can adversely affect the core. Their high neutron capture cross sections severely depress the power output from the fuel assemblies in which they are located. Therefore, otehr fuel assemblies not having control rods associated therewith are required to produce correspolndingly more power. The mismatch in the power output between the "rodded" and "unrodded" fuel assemblies, which may be adjacent to each other, can be quite large and can restrict the overall power output from the nuclear reactor.

Accordingly, objects of the present invention are to provide a control rod cluster assembly for a light water nuclear reactor which flattens the axial and radial power distribution within the core, reduces the need for high priced control rod materials, provides improved reactor control, provides acceptable shutdown margin and renders less severe various postulated accidents. Other objects not specifically mentioned will be obvious to one skilled in the art to which the invention pertains, which objects are intended to be included within the scope of the present invention.

SUMMARY OF THE INVENTION

The above objects as well as others are achieved by the present invention which comprises a control rod cluster assembly having a plurality of rods attached thereto with certain of the rods comprising $B_4C$ pellets, or hafnium or silver-indium-cadmium rodlets enclosed within a metal cladding and the other of the rods comprising a solid material such as stainless steel. The combination lowers reactivity worth of the control rods, improves load follow performance of the reactor core and renders less severe the consequences of postulated accidents and reduces power peaking throughout the core that can result due to control rod insertions.

BRIEF DESCRIPTION OF THE DRAWINGS

Various other objects, advantages and features of the invention will become apparent to those skilled in the art from the following discussion taken in conjunction with the following drawings, in which.

DESCRIPTION OF THE PREFERRED EMBODIMENTS

Figure 1:
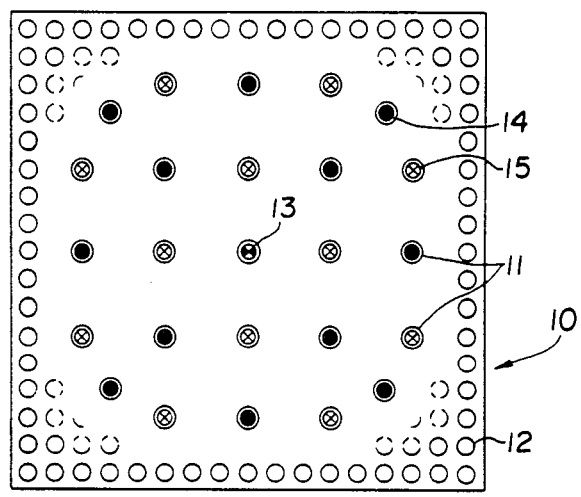
FIG. 1 schematically shows a cross-sectional view of a typical fuel assembly illustrating one arrangement of differing worth rods within a rod cluster assembly; and, FIG. 2 schematically shows an arrangement of a nuclear core incorporating the rod cluster assemblies of FIG. 1.

Referring now to the drawings, specifically FIG. 1 thereof, which schematically illustrates one embodiment of the present invention, a typical fuel assembly 10 is known to comprise a parallel array of fuel rods having a plurality of guide tubes interspersed among the fuel rods. Guide tubes 11 typically comprise hollow tubes which function as guides for the individual rods of the rod control cluster assembly. Guide tubes 11 are generally made from an alloy of zirconium which has a low neutron capture cross section. Fuel rods 12 commonly comprise pellets or nuclear fuel such as uranium enriched in uranium-235 which pellets are stacked one on top of each other within another tube made of an alloy of zirconium. Without the water coolant filling the spaces between fuel rods, the neutrons produced by the enriched nuclear fuel would be fast neutrons which are unsuitable to produce fission. With the water coolant within the fuel assemblies, the fast neutrons are thermalized by the water which is an excellent moderator. The thermal neutrons are more efficient as compared to fast neutrons in fissioning U-235. Hence, the water moderator sustains the criticality of the core. Water is known to be further advantageous because of its negative coefficient of reactivity. Cool water, because of its density, is a much better moderator than hot water. In fact, it is well known that if water get too hot, its negative coefficient of reactivity will actually shut down the reactor. This inherent safety aspect of water-cooled reactors makes such reactors among the safest in the world and substantially diminishes the actual need for shutdown control rods. Conservative safety reasons still require the use of shutdown control rods which are designed to produce rapid shutdown of the reactor in emergency situations. The load follow control rods are of a different category than the shutdown control rods. Load follow control rods control the power output of a nuclear reactor and are essential to the proper operation of a nuclear reactor.

Figure 3:
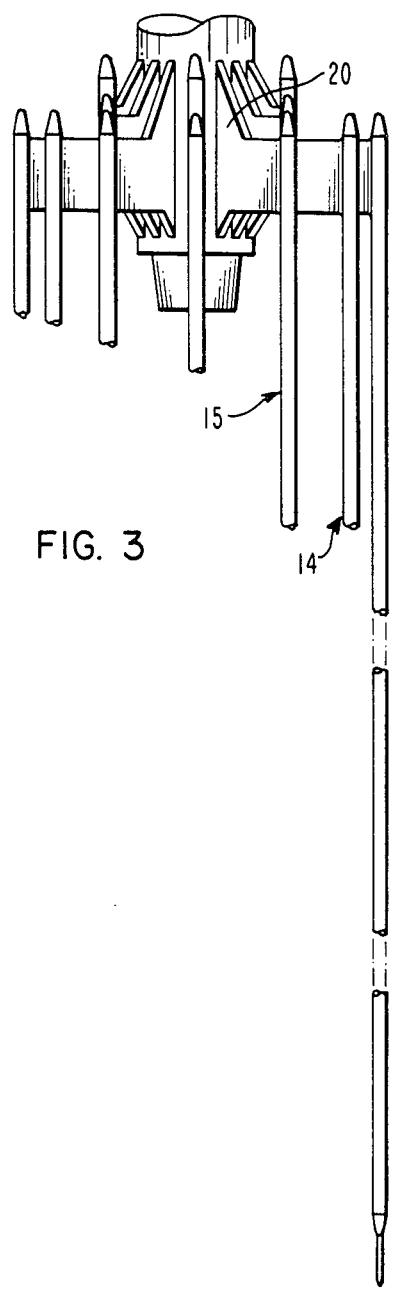
FIG. 3 illustrates one embodiment of differing worth control rods attached to a common hub or carrier.

The general mechanical design of the control rods of the present invention is not critical to the invention. Hence, the known parallel array of a plurality of individual elongated control rods attached to a common hub or spider, FIG. 3, which in turn is attached to a shaft which sealingly penetrates the closure head of the pressure vessel may be utilized as the structure for the explanation of the present invention.

In the 17×17 fuel assembly 10, shown in FIG. 1, there are twenty-five guide tubes 11 interspersed among the fuel rods 12. The centermost guide tube 11 is for an instrumentation rod 13. The control rods of the prior art as well as the control rods of the present invention fit within guide tubes 11. Hence, the present invention is backfittable into prior art reactors. Of the twenty-four individual control rods attached to the common hub 20, twelve may comprise the known absorber rods comprising $B_4C$, hafnium or silver-indium-cadmium. The remaining twelve rods may comprise solid stainless steel rods, such as type 304. One distribution of the stainless steel rods 14 and the absorber rods 15 is shown in FIG. 1. It is seen that the absorber rods 15 are adjacent only to stainless steel rods 14 and not to other absorber rods 15. In this manner, the strong neutron absorbing effect of absorber rods 15 is widely dispersed across the cross section of fuel assembly 10.

The overall effect of the combined stainless steel absorber control rod cluster is one of lower reactivity worth. Reactor control and the method of maintaining reactor control, however, is not different from the prior art. The lower overll reactivity worth reduces power peaking and serves to flatten the power distribution axially and radially within the core. The lower reactivity worth of the control rod cluster allows the fuel assemblies associated with the control rod clusters (when the control rod cluster is inserted within the fuel assembly) to operate at a higher power output and since the overall power output of the core remains the same for any given power level of operation, the remaining fuel assemblies may then operate at a lower individual power output. Another beneficial effect is realized since the hottest spot in the core will also operate at a lower power and temperature. For a given peak hot spot relative power, this in turn will allow the reactor to operate at a higher average power thereby increasing the power capacity of the reactor.

Combinations other than that shown in FIG. 1 are possible. Thus, more or fewer stainless steel rods may be used. Also, the relative reactivity worth between the stainless steel rods 14 and the absorber rods 15 may be decreased by decreasing the amount of absorber material in absorber rods 15 and/or adding higher worth absorber material to the stainless steel rods such as, for example, by coating, alloying or intermixing of stainless steel with absorber materials. The main consideration as to how much the reactivity worth of the control rod cluster may be reduced is primarily controlled by the reactor shutdown margin constraints. Calculations have shown that the configuration in FIG. 1 still provides an acceptable shutdown margin.

Figure 2:
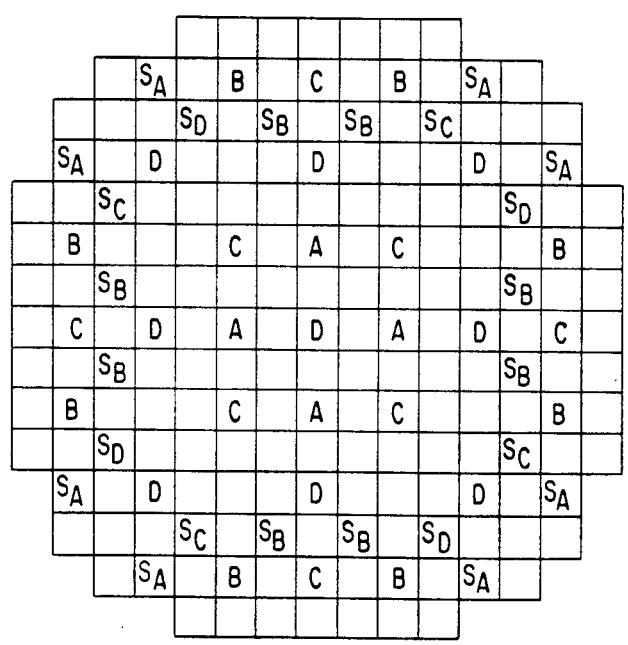

FIG. 2 schematically depicts a cross section of a core of a four loop plant having fifty-three control rod cluster locations and one hundred and ninety-three fuel assemblies. There are four banks of load follow control rod clusters A, B, C and D and four banks of shutdown control rod clusters SA, SB, SC and SD. Each of the above banks, respectively, have 4, 8, 8 and 9, and 8, 8, 4 and 4 control rod clusters associated with each bank. The load follow banks are sequentially inserted in the sequence of D, C, B and A banks with the rod clusters within each bank being inserted as a unit. In accordance with maintaining adequate shutdown margins in a four loop plant as described which may, for example, be licensed for 1.3% DK/K (change in reactivity in the core) shutdown margin, and having optimized 17×17 fuel assemblies and $B_4C$ control rods, it has been determined that twelve of the twenty-four rods in each of the D bank rod clusters may be replaced with twelve stainless steel 304 rods. Should the shutdown margin requirement be allowed to be further reduced or if the reactor is provided with other safety features which increase the shutdown margin, then part of the rods from the C bank of rod clusters may be replaced with stainless steel rods to further improve core neutronics and effectuate additional core operating margins.

In addition to the above, the present invention results in considerable benefits in the safety analysis. Because of the reduced reactivity worth of each rod cluster control assembly, steambreak accidents and rodded accidents are rendered less severe. For example:

Hot Full Power Rod Ejection. The invention offers 20 to 25% reduction in both ejected worth and peak relative power in the core.

Hot Zero Power Rod Ejection. Relative to the non-stainless steel rod D bank, the benefits range from approximately zero at the beginning of a typical fuel reload cycle to an approximate 15% reduction at end of the fuel cycle in the peak relative core power and 40% reduction in ejected worth.

Normal Operation Hottest Fuel Rod Limit in the Core. There is up to a 2% gain in reduction in the hottest fuel rod in the core when the D bank is inserted to its insertion limit.

Loss of Coolant Postulated Accident. The invention reduces the peak relative power in the core by approximately 5% at the 10.5 to 12.0 feet axial elevations which are typically the most limiting elevations in reload cycles.

Steambreak. In the hot shutdown condition (with the most reactive control rod assumed to malfunction and be stuck out of the core as required by the safety analysis) the relative hottest fuel rod power in the core is reduced by approximately 9%. This translates to a 10 to 15% Departure from Nuclear Boiling (DNB) benefit.

While the invention has been described, disclosed, illustrated and shown in certain terms or certain embodiments or modifications, the scope of the invention is not intended to be nor should it be deemed to be limited thereby and such other modifications or embodiments as may be suggested by the teachings herein are particularly reserved especially as they fall within the breadth and scope of the claims here appended.

We claim as our invention:

1. In a nuclear reactor including a nuclear core which is cooled and moderated by light water, said nuclear core comprising a plurality of parallel arranged openings therethrough and interspersed among said fuel assemblies, a control rod cluster arrangement comprising a plurality of load follow control rod cluster assemblies with each load follow control rod cluster assembly being adapted to slidingly fit within each of some of said fuel assemblies in said parallel arranged openings, said load follow control rod cluster assemblies each comprising a plurality of elongated parallel arranged rods attached to a single spider, and including a first group of rods and a second group of rods, said first group of rods and said second group of rods each consisting of a plurality of absorber rods, said first group of rods consisting of absorber rods taken from the group consisting of $B_4C$, hafnium, or silver-indium-cadmium and said second group of rods consisting of absorber rods each consisting of stainless steel, said first group of rods and said second group of rods each being integrally attached at all times to said single spider, the absorber rods of said second group of rods being dispersed throughout the control rod cluster assembly, said first group of rods having a first neutron capture cross section and said second group of rods having a second neutron capture cross section different from said first cross section.

2. The control rod cluster assembly of claim 1, wherein the number of said second group having a second neutron capture cross section is at least numerically equal to the number of first neutron capture cross section rods.

* * * * *